US008946921B2

(12) United States Patent
Kaiser

(10) Patent No.: US 8,946,921 B2
(45) Date of Patent: Feb. 3, 2015

(54) PRESSURE POWERED IMPELLER SYSTEM AND RELATED METHOD OF USE

(75) Inventor: Stewart Kaiser, Boca Raton, FL (US)

(73) Assignee: Plexaire, LLC, Wayne, NJ (US)

( * ) Notice: Subject to any disclaimer, the term of this patent is extended or adjusted under 35 U.S.C. 154(b) by 401 days.

(21) Appl. No.: 13/085,227

(22) Filed: Apr. 12, 2011

(65) Prior Publication Data
US 2012/0261921 A1 Oct. 18, 2012

(51) Int. Cl.
F03B 13/00 (2006.01)
H02P 9/04 (2006.01)
H02K 7/18 (2006.01)
F03B 13/10 (2006.01)
H02P 11/00 (2006.01)
H02H 7/06 (2006.01)

(52) U.S. Cl.
CPC .................................... H02K 7/1823 (2013.01)
USPC .................. 290/54; 290/43; 322/35

(58) Field of Classification Search
USPC ........................ 290/43, 54; 322/35
See application file for complete search history.

(56) References Cited

U.S. PATENT DOCUMENTS

| 1,946,182 | A | * | 2/1934 | Thompson | 415/49 |
| 2,202,406 | A | | 5/1940 | Staege | |
| 2,276,714 | A | * | 3/1942 | Brown | 415/203 |
| 2,460,258 | A | | 1/1949 | Jones | |
| 3,494,113 | A | | 2/1970 | Kinney | 55/481 |
| 3,750,001 | A | * | 7/1973 | McCloskey | 322/35 |
| 3,921,052 | A | * | 11/1975 | Milano | 322/35 |
| 4,122,381 | A | * | 10/1978 | Sturm | 320/128 |
| 4,142,367 | A | * | 3/1979 | Guisti | 60/325 |
| 4,188,862 | A | | 2/1980 | Douglas, III | |
| 4,228,786 | A | | 10/1980 | Frankenfield | |
| 4,352,025 | A | * | 9/1982 | Troyen | 290/54 |
| 4,369,373 | A | * | 1/1983 | Wiseman | 290/2 |
| 4,387,575 | A | * | 6/1983 | Wenzel | 60/648 |

(Continued)

FOREIGN PATENT DOCUMENTS

EP 0593005 A1 4/1994
GB 2140121 A 11/1984

(Continued)

OTHER PUBLICATIONS

Office Action issued in U.S. Appl. No. 12/816,430 dated Jan. 15, 2013.

(Continued)

Primary Examiner — Pedro J Cuevas
(74) Attorney, Agent, or Firm — Venable LLP; Michele V. Frank

(57) ABSTRACT

This invention is directed to a system that generates a sufficient level of electricity through access to a municipal water supply line to run a furnace during below freezing temperatures. The system includes an inlet that draws water from a water supply line. A first conduit, in communication with the inlet, transports the water into a DC generator that includes an impeller to generate electricity. Water is then routed through a second conduit which then returns the water to the water supply line through an outlet. A solenoid valve may be positioned between the inlet and first conduit which remains closed when the electric grid runs normally but will open during a power outage to supply water to the DC generator. A lithium battery stores power created by the DC generator, which may include a voltage regulator and inverter to convert to DC.

15 Claims, 3 Drawing Sheets

(56) References Cited

U.S. PATENT DOCUMENTS

| | | | |
|---|---|---|---|
| 4,408,127 A * | 10/1983 | Santos, Sr. | 290/54 |
| 4,489,290 A * | 12/1984 | Warner | 322/35 |
| 4,496,845 A * | 1/1985 | Ensign et al. | 290/43 |
| 4,647,373 A | 3/1987 | Tokar et al. | |
| 4,713,209 A | 12/1987 | Ishimaru et al. | |
| 4,808,837 A * | 2/1989 | Matthias et al. | 290/54 |
| 4,998,412 A | 3/1991 | Bell | 62/126 |
| 5,043,592 A * | 8/1991 | Hochstrasser | 290/52 |
| 5,079,495 A * | 1/1992 | Yasuo | 320/101 |
| 5,085,244 A | 2/1992 | Funk | 137/240 |
| 5,201,806 A | 4/1993 | Wood | |
| 5,271,237 A | 12/1993 | Popelka et al. | |
| 5,293,894 A | 3/1994 | Fleischmann | |
| 5,354,365 A | 10/1994 | Youn | 96/135 |
| 5,389,821 A * | 2/1995 | Moulliet | 290/1 R |
| 5,461,875 A | 10/1995 | Lee et al. | |
| 5,673,851 A | 10/1997 | Dozier et al. | |
| 5,742,515 A * | 4/1998 | Runkle et al. | 700/287 |
| 5,964,238 A | 10/1999 | Junkin | 137/15.05 |
| 5,989,303 A | 11/1999 | Hodge | |
| 6,010,113 A | 1/2000 | Rotering | |
| 6,165,240 A | 12/2000 | Hodge | |
| 6,182,677 B1 | 2/2001 | Pignataro | 137/15.05 |
| 6,276,894 B1 | 8/2001 | Koch | |
| 6,371,631 B1 | 4/2002 | Reutemann | |
| 6,427,458 B1 | 8/2002 | Fowler | |
| 6,442,956 B1 | 9/2002 | Herren | 62/150 |
| 6,584,995 B2 | 7/2003 | Kimbrough et al. | 137/240 |
| 6,708,717 B1 | 3/2004 | Coogle | 137/240 |
| 6,765,308 B1 * | 7/2004 | Kazanjian et al. | 290/43 |
| 6,811,588 B2 | 11/2004 | Niakin | |
| 6,971,399 B2 * | 12/2005 | Cowan | 137/209 |
| 6,971,631 B1 | 12/2005 | Naughton | |
| 6,976,367 B2 | 12/2005 | Spanger | 62/129 |
| 7,032,406 B2 | 4/2006 | Hollen et al. | |
| 7,191,606 B1 | 3/2007 | Dwyer | 62/150 |
| 7,335,999 B2 * | 2/2008 | Potter et al. | 290/43 |
| 7,357,599 B2 * | 4/2008 | Cripps | 405/75 |
| 7,392,658 B1 | 7/2008 | Hardy, III | 62/78 |
| 7,452,160 B2 * | 11/2008 | Cripps | 405/75 |
| 7,488,364 B1 | 2/2009 | Thomas et al. | |
| 7,501,712 B2 * | 3/2009 | Bolyard | 290/43 |
| 7,632,040 B2 * | 12/2009 | Cripps | 405/75 |
| 7,768,146 B2 * | 8/2010 | Balzano | 290/54 |
| 7,802,942 B2 * | 9/2010 | Cripps | 405/75 |
| 7,834,478 B2 * | 11/2010 | Baumann et al. | 307/9.1 |
| 7,857,004 B2 | 12/2010 | Pearson | |
| 7,888,590 B2 * | 2/2011 | Niederer | 136/251 |
| 7,897,039 B2 | 3/2011 | Koo | |
| 7,915,749 B1 * | 3/2011 | Chupa et al. | 290/43 |
| 7,946,789 B2 * | 5/2011 | Cripps | 405/75 |
| 8,002,499 B2 * | 8/2011 | Cripps | 405/75 |
| 8,092,675 B2 * | 1/2012 | Kennedy | 210/167.11 |
| 8,102,076 B2 * | 1/2012 | Baumann et al. | 307/9.1 |
| 8,147,167 B2 * | 4/2012 | Cripps | 405/75 |
| 8,147,168 B2 * | 4/2012 | Cripps | 405/75 |
| 8,154,138 B2 * | 4/2012 | Ganesan et al. | 290/43 |
| 8,172,092 B2 | 5/2012 | Green et al. | |
| 8,231,327 B2 * | 7/2012 | Davis, Sr. | 415/3.1 |
| 8,240,168 B2 | 8/2012 | Holguin | |
| 8,294,292 B2 * | 10/2012 | Irwin et al. | 290/54 |
| 8,376,656 B2 * | 2/2013 | Cripps | 405/75 |
| 8,511,073 B2 * | 8/2013 | Kaiser | 60/298 |
| 8,590,605 B2 * | 11/2013 | Kaiser | 165/163 |
| 2001/0042792 A1 | 11/2001 | Kline et al. | |
| 2003/0056812 A1 | 3/2003 | Baker et al. | 134/36 |
| 2004/0134533 A1 * | 7/2004 | Cowan | 137/209 |
| 2006/0196953 A1 | 9/2006 | Simon et al. | |
| 2006/0260672 A1 * | 11/2006 | Niederer | 136/251 |
| 2007/0028640 A1 | 2/2007 | Hampton | |
| 2007/0175192 A1 | 8/2007 | Niakan et al. | |
| 2007/0190927 A1 | 8/2007 | Bash et al. | |
| 2007/0212213 A1 * | 9/2007 | Bolyard | 415/151 |
| 2008/0041969 A1 | 2/2008 | Nathan | |
| 2009/0084127 A1 | 4/2009 | Nakata et al. | |
| 2009/0085400 A1 * | 4/2009 | Baumann et al. | 307/9.1 |
| 2009/0171506 A1 | 7/2009 | Donaldson et al. | |
| 2009/0206661 A1 * | 8/2009 | Baumann et al. | 307/10.1 |
| 2009/0236432 A1 | 9/2009 | Malloy | |
| 2010/0026088 A9 * | 2/2010 | Baumann et al. | 307/9.1 |
| 2010/0026091 A9 * | 2/2010 | Baumann et al. | 307/10.1 |
| 2010/0026100 A1 * | 2/2010 | Teggatz et al. | 307/82 |
| 2010/0033015 A1 * | 2/2010 | Alvarez | 307/72 |
| 2011/0061745 A1 | 3/2011 | Pearson | |
| 2011/0120067 A1 | 5/2011 | Kim | |
| 2011/0308546 A1 | 12/2011 | Kaiser | 134/18 |
| 2011/0308557 A1 | 12/2011 | Kaiser | 134/56 R |
| 2011/0308636 A1 | 12/2011 | Kaiser | 137/101.27 |
| 2012/0198804 A1 | 8/2012 | Kaiser | 55/486 |
| 2012/0248206 A1 | 10/2012 | Kaiser | 236/49.3 |
| 2012/0261921 A1 | 10/2012 | Kaiser | |
| 2012/0273069 A1 * | 11/2012 | Klicpera et al. | 137/551 |
| 2013/0168304 A1 | 7/2013 | Kania et al. | |
| 2013/0298538 A1 * | 11/2013 | Mogi | 60/320 |
| 2014/0202363 A1 * | 7/2014 | Hiraguri | 110/224 |
| 2014/0209697 A1 * | 7/2014 | Kaiser | 237/55 |
| 2014/0238511 A1 * | 8/2014 | Klicpera | 137/551 |

FOREIGN PATENT DOCUMENTS

| | | |
|---|---|---|
| GB | 2382843 A | 6/2003 |
| JP | S62-175544 A | 8/1987 |
| JP | H02-176327 A | 7/1990 |

OTHER PUBLICATIONS

Restriction Requirement issued in U.S. Appl. No. 12/816,430 dated Oct. 3, 2012.
PCT/US13/69912: International Search Report and Written Opinion mailed Apr. 4, 2014.
U.S. Appl. No. 12/958,466: Restriction Requirement dated Apr. 30, 2013.
U.S. Appl. No. 12/960,752: Restriction Requirement dated Apr. 29, 2013.
U.S. Appl. No. 13/023,634: Office Action dated Mar. 11, 2013.
U.S. Appl. No. 13/073,612: Office Action dated Nov. 22, 2013.
U.S. Appl. No. 13/085,227: Office Action dated Jun. 12, 2013.
Risko, (1996), Steam Heaters need Complete Condensate Drainage: The condensate system may require more decision making than the heater itself, Chemical Engineering, 103(7), 114.
The ICM System, The inevitable condensate clog . . . causes property damage, shuts down retail revenues, and worse of all creates disgruntled customers!, http://plexaire.com/icm/, pp. 1-2.

* cited by examiner

US 8,946,921 B2

PRESSURE POWERED IMPELLER SYSTEM AND RELATED METHOD OF USE

FIELD OF THE INVENTION

This invention is directed toward a pressure powered generator system capable of generating a sufficient quantity of electricity to fuel a furnace and HVAC system in the event of a power outage during below freezing weather so as to prevent the freezing of a domestic water supply line.

BACKGROUND OF THE INVENTION

One of the most common causes of a power outage is a sudden snow or ice storm. Such inclement weather will often cause the downing of power lines (due largely to the weight of the snow or ice) and other municipal infrastructure within the electrical grid used to supply residential electricity. Because such snow and ice storms also cause downed trees and blockage of roads, municipal authorizes often must wait several hours (often days) in order to repair this infrastructure. During such wait time, residential homes may be without electricity for prolonged periods of times often with temperatures dipping below freezing.

A residential home may not be able to maintain heat during these prolonged power outages—even when a furnace is based upon propane, natural gas, fuel oil or other fossil fuel. This is because there will be no electrical source to maintain the controls necessary to regulate the furnace, as well as no ability to maintain an ignition source for such heat supply. Thus, even though there is a steady supply of fuel available during this inclement weather—such as a repository of propane—maintained at the home—there is no ability to fuel the home because there is no sufficient level of electricity to regulate the furnace or ignite the fuel routinely to maintain a comfortable temperature in the home.

Without the ability to regulate the temperature of the home, the foundation of the home will likewise begin to loose heat. This in turn may result in the freezing of water supply lines into the home. Therefore, once the electrical grid is repaired and power restored, there may nonetheless be the secondary issue of a loss of water supplied to the home. While a secondary issue caused by a snow or ice storm, the loss of water supply is often more difficult to repair and may cause larger damage and inconvenience to the home owner.

Very little has been done to create cost effective means for home owners to plan for a power outage cause by a snow or ice storm. One solution available today is the purchase of a self-contained electrical generator that may supply electricity for a short period of time to the furnace and other essential components of a home. However, electrical generators are limited in the amount of fuel that they can carry, the amount of electricity that they supply—plus you often have to run multiple extension cords throughout the home to supply energy. Moreover, such generators are expensive and cumbersome to store.

Another solution is to equip a furnace with a large electrical battery. However, this is not only cumbersome, but it still has the limitation as to life expectancy. Should a power outage be prolonged, a mere electrical battery may not have a sufficient amount of energy to power both the control and ignition source for the fossil fuel powered furnace. Moreover, a simple battery will not be able to supply power to other necessary appliances such a refrigerator.

Accordingly, there is a need in the art of heating, ventilation and air conditioning (HVAC) systems for a device capable of providing sufficient electrical power to both a furnace and other key appliances in the event of a power outage during a cold weather event such as a snow or ice storm. Such system should be cost effective, robust and capable of supplying this level of electricity for prolonged periods of time sufficient to allow municipal authorities to identify and fix any problems. Lastly, the system should help reduce risk of the freezing of water supply lines during such cold weather event.

SUMMARY OF THE INVENTION

This invention is directed to a system that generates a sufficient level of electricity through access to a municipal water supply line that may run a furnace during below freezing temperatures. The system may include an inlet that draws water from a water supply line. A first conduit, in communication with the inlet, transports the water into a generator that includes an impeller to generate electricity. Water is then removed from the generator through a second conduit that then returns the water to the water supply line through an outlet.

A solenoid valve may be positioned between the inlet and first conduit which remains closed when the electric grid runs normally but will open during a power outage to supply water to the generator. A lithium battery stores power created by the generator, which may include a voltage regulator and inverter or rectifier to convert to DC (as desired).

The invention is also directed to a method of powering a furnace in the event of a power failure during below freezing temperatures. The method of using the system first includes the normal flow of water through a water supply line during receipt of power from an electric grid (usually from a municipality). The method may next include opening a solenoid valve (positioned proximate the intake) during the event of a power outage.

As a third step, the water is engaged within a generator that may communicate with the first conduit to generate electricity. Upon creating power, the water re-routed into a second conduit for returning the water to the water supply line through an outlet in communication with the second conduit.

Optionally, the method may include regulating electricity through use of a voltage regulator to create a uniform voltage of power created by the generator. In addition, such method may include inverting the power created by the generator into DC and then storing the DC in a battery for later use and supply to a furnace. Later, this stored power within the battery may be retrieved through a Logic network.

BRIEF DESCRIPTION OF THE DRAWINGS

For a fuller understanding of the invention, reference is made to the following detailed description, taken in connection with the accompanying drawings illustrating various embodiments of the present invention, in which.

DETAILED DESCRIPTION OF THE EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
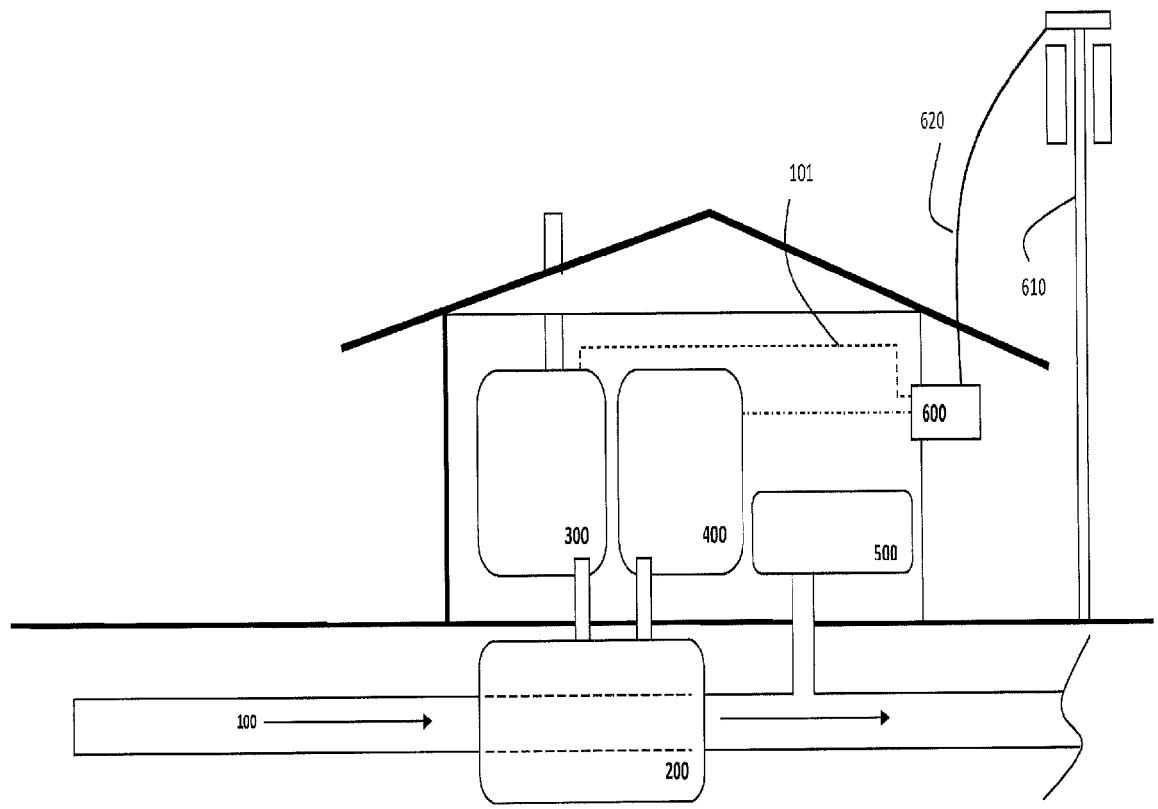
FIG. 1 is a front view illustrating placement of the system in light of a residential home.
Figure 2:
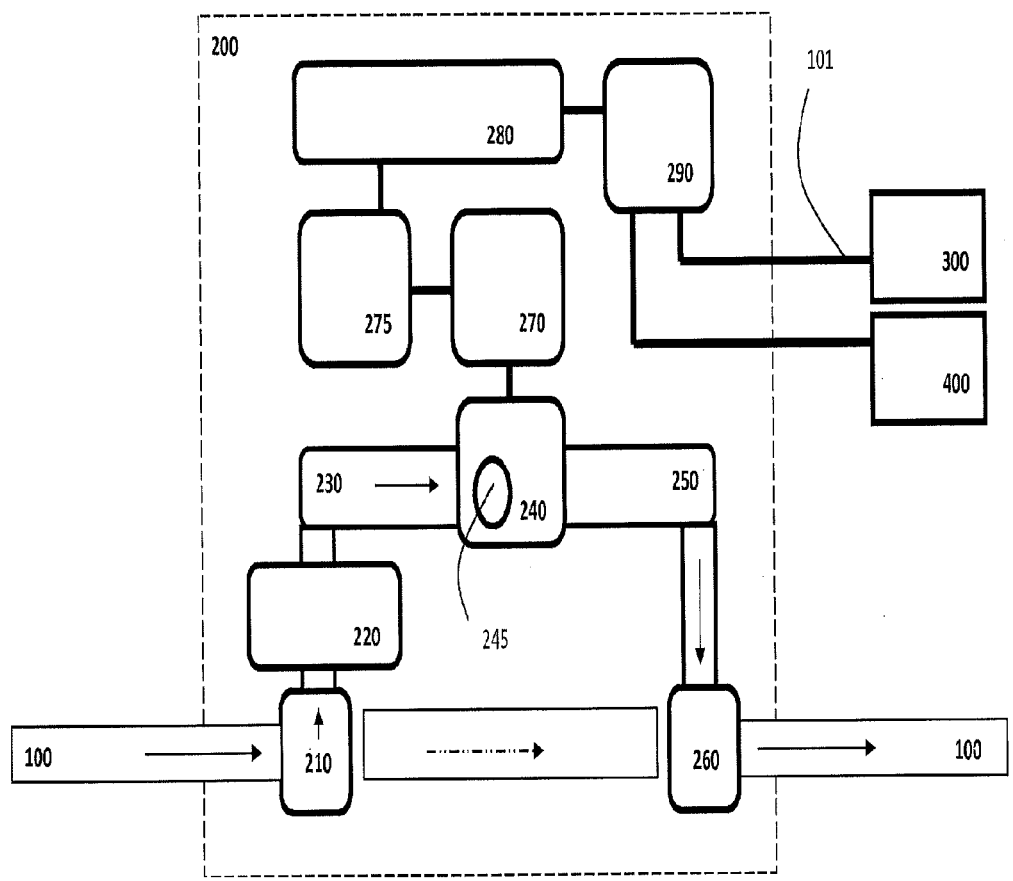
FIG. 2 is a front view showing the salient components of the system, including a DC generator.

As shown in both FIG. 1 and FIG. 2, the invention is directed to a self-contained system 200 which is positioned within a home in direct communication with a municipal water supply line 100. Through direct access of water 110 passing through the municipal water supply line 100, the system 200 generates electricity 101. This power in turn is supplied to the furnace 300 and any critical appliances 400 (such as a refrigerator, range, etc.). Accordingly, the system 200 not only functions to maintain an acceptable temperature within the home during a power outage (by allowing the furnace 300 to run), but also allows food to stay refrigerated and allow use of other appliances to warm food and provide for other necessities.

The system 200 is small, modular, and lightweight. One embodiment as herein described by way of example is approximately sixteen inches wide by sixteen inches long by sixteen inches tall. Moreover, the system 200 can easily be installed proximate the water supply line 100. The system 200 is designed to be robust, water proof and not susceptible to corrosion.

Placement of the System

FIG. 1 illustrates, by way of example, one manner of placing the system 200 to engage a water supply line 100 to generate electricity 101 in case of a failure of the electrical grid. First, FIG. 1 shows how a typical residential home will feature a water supply line 100 positioned below or proximate the home, which communicates with a water intake 500. This water intake 500 allows for use and enjoyment of municipal water 110 for use in cooking, plumbing, sanitation, irrigation and other domestic uses. Water 110 drawn from the water supply line 100 is typically read by a water meter and charge accordingly to the household by the municipality.

Further illustrated in FIG. 1 are typical features of a home, including a furnace 300 and appliances 400. In this application, the furnace 300 runs on some form of fossil fuel, such as propane, natural gas, fuel oil or related hydrocarbon. Such fossil fuel may be housed and maintained within a central receptacle near the home (i.e., a propane tank) or may be offered by a supply line 100 (i.e., city gas line). Accordingly, such furnace 300 needs very little electricity to offer heat to the home, as the main source of energy is the gas or liquid fossil fuel. Optionally, the furnace 300 may be part of a co-generation system that allows use of applicable heat for other purposes, including but not limited to preheating water 110 prior to entry into a flash heater.

Both the appliances 400 and the furnace 300 (and/or co-generation system) may be supplied electricity 101 from a municipal power source. As further shown in FIG. 1, electricity 101 from the electric grid is provided to a power pole 610 located proximate the home. A power line 620 connects the power pole 610 to a power meter 600 affixed to the home. In turn, the power meter 600 supplies electricity 101 to both the furnace 300 and appliances 400 when the electricity grid is properly functioning. The power meter 600 records the amount of electricity 100 consumed by the home.

Unlike the traditional home, FIG. 1 further shows addition of the system 200 in direct communication with the water supply line 100. As shown, such system 200 is positioned below or proximate to the base of the home, near the foundation block and/or basement below the firmament. Water 110 is capable of being diverted from the water supply line 100 into the system 200 for later return to the water supply line 100. Accordingly, the system 200 will not actually remove or spend any of the water 110 present in the water supply line 100 and thus will not affect the water bill.

Components of the System

While FIG. 1 illustrated the placement of the system 200, FIG. 2 shows its salient components. First, an intake 210 is positioned within the water supply line 100. This intake 210 diverts a portion of water 110 from the water supply line 100 into the system 200. Normally, the water 110 from the intake 210 does not flow through the system 200, due to solenoid valve 220. The solenoid valve 220 only opens when there is a determination that there is a lapse in power supplied by the electrical grid.

Upon a breach of the power supply received from the power meter 600 (shown in FIG. 1), the solenoid valve 200 within the system 200 opens and allows entry of water 110 diverted from the water supply line 100. Water 110 then will flow through the solenoid valve 220 and into a first conduit 230 which is in direct communication with the DC generator 240. While a variety of generation systems may be used within the DC generator 240 to create electricity, the invention contemplates use of an impeller 245. However, other electrical generator systems are contemplated, including use of a turbine.

Through spinning the impeller 245 via flow of water 110 supplied by the first conduit 230, electric current is generated by the DC generator 240. Water 110 exits via the second conduit 250, which feeds an outlet 260. The outlet 260 returns the water 110 to the water supply line 100, which may be then used by the home for water.

As further shown in FIG. 2, a voltage regulator 270 helps create more uniform electrical current based upon supply from the DC generator 240 (or optionally an AC generator). Electricity flows from the voltage regulator 270 into an inverter or rectifier 275 (if needed) to create DC. This power is stored within a self contained electrical power supply, which may take the form of a battery 280. Any battery 280 may be used, but it is preferably lithium ion (more specifically lithium phosphate). Regardless of form, the battery 280 communicates with a Logic network 290. The Logic network 290 functions as a controller to determine when and how much electricity 101 shot be supplied to both the furnace 300 and various appliances 400 connected to the system 200.

Through the energy created by the DC generator 240, the Logic network 290 will routinely allow electricity to be supplied to the furnace 300 to maintain a comfortable temperature within the home. Likewise, such Logic network 290 will supply key appliances 300 with enough electricity to run.

Method of Use

Figure 3:
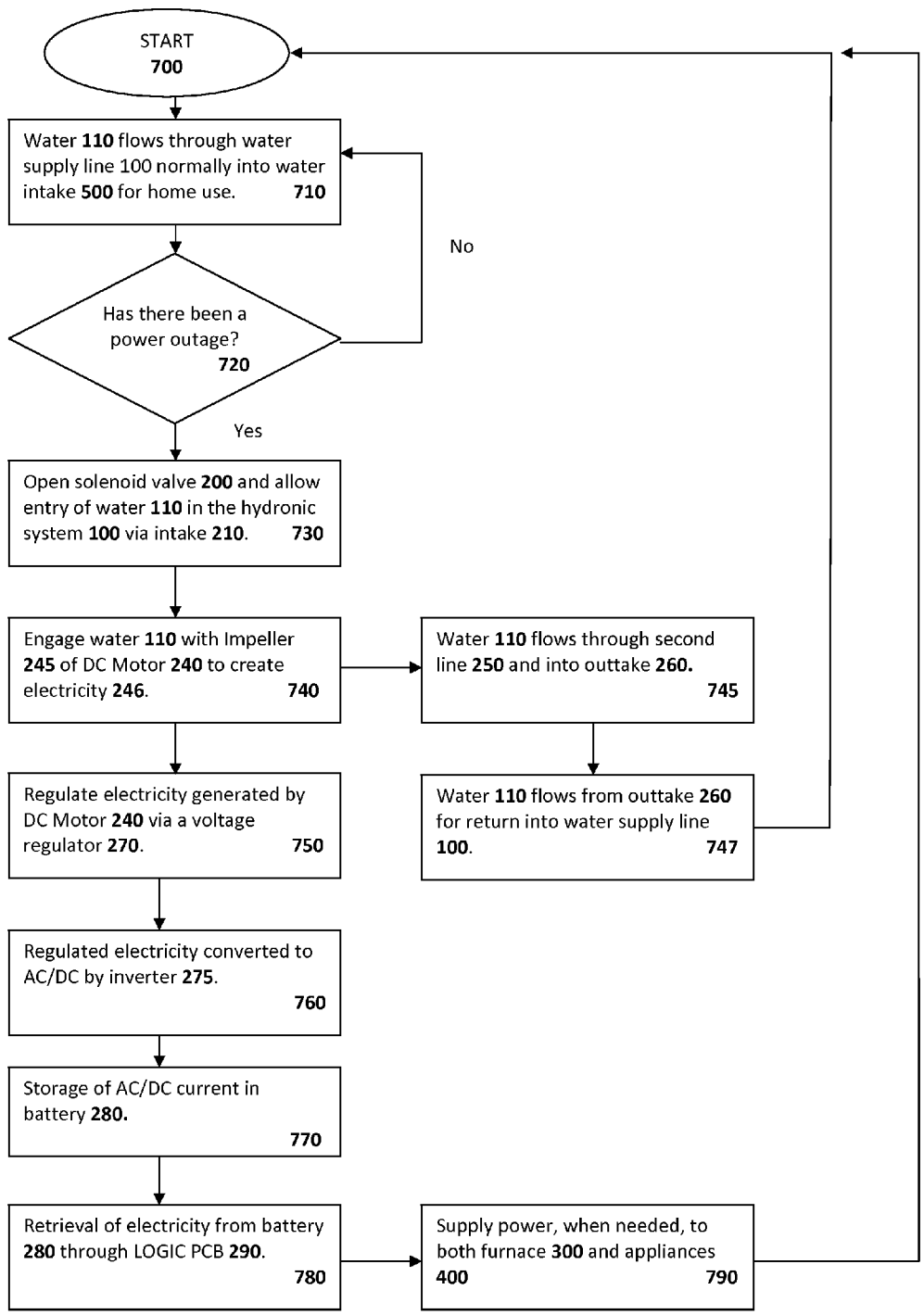
FIG. 3 is a flow chart that illustrates the various steps the system uses to maintain power to the furnace and necessarily appliances in the event of a power outage.

The invention not only contemplates an apparatus, but also a method of using a system 200 to supply electricity 101 in the event of a power outage caused by a snow or ice storm. FIG. 3 illustrates, by way of example, one method for using the system 200 to provide a sufficient level of power to supply energy to a furnace 300 to allow ignition of fossil fuels to maintain the home at a sufficient temperature.

As shown in FIG. 3, the process starts (at 700) with allowing normal flow of water 110 (at 710) through water supply line 100, which in turn may allow transfer into the water intake 500 for normal consumption and use. Next, the system 200 determines (at 720) whether there has been a power outage. Such power outage could be due to, among other things, a winter storm which may have caused downed power lines. Optionally, this step may include checking the outside and/or ground temperature to assess if there is a risk that the pipes may freeze without resuming power.

If there is no power outage, the system 100 continues with normal operations. Otherwise, the system 100 calls for opening (at 730) a solenoid valve 220 to allow entry of water 110 from the intake 210. Water 110 then flows from the intake 210 through a first conduit 230 which then engages (at 740) an impeller 245 operable within a DC generator 240 to create electricity 101. By spinning the impeller 245 electricity 101 is created which is then regulated (at 750) by a voltage regulator 270.

As further shown in FIG. 3, power may be then converted (at 760) into DC by an inverter 275 (if necessary). Once inverted, power is stored (at 770) in a battery 280, which may be made of lithium ion. Next, the method contemplates retrieving (at 780) the electricity 101 from the battery 280 through a LOGIC network 290. Such LOGIC network 290 then allows a sufficient level of power to be supplied to the furnace 300 and other necessary appliances 400.

As further shown in FIG. 3, once water 110 engages the impeller 245 of the DC generator 240, the fluid is transported (at 745) via a second conduit 250 into the outtake 260. Lastly, the water 110 flows (at 747) out of the outtake for return to the water supply line 100

I claim:

1. A system configured to determine if a power outage occurs and to generate electricity from a municipal water source to run a furnace, the system comprising:
   an inlet configured to draw water from a water supply line;
   a first conduit configured to transport water from the inlet into a generator, wherein the generator is capable of generating electricity;
   a second conduit configured to transport water from the generator to an outlet, wherein the outlet is configured to return water to the water supply line; and
   a battery configured to store electricity created by the generator for supplying electricity to a furnace; and
   a solenoid valve positioned between the inlet and the first conduit, wherein the solenoid valve is configured to open in response to when the system determines that a power outage has occurred;
   wherein the water supply line is configured to flow water therethrough from the inlet to the outlet when the solenoid valve is closed.

2. The system of claim 1, wherein the solenoid valve remains closed when an electric grid is operating to supply power to the furnace thereby blocking flow of water into the generator.

3. The system of claim 1, wherein the generator is operable with an impeller to generate electricity.

4. The system of claim 1, further comprising:
   a voltage regulator configured to receive electricity from the generator and provide a uniform voltage; and
   a rectifier configured to receive power from the voltage regulator and create a desired current prior to entry into the battery.

5. The system of claim 1, wherein the battery is a rechargeable lithium ion battery.

6. The system of claim 1, further comprising:
   a logic controller configured to determine when to draw electricity from the battery to power the furnace.

7. A method of supplying electricity to a furnace in the event of a power outage during below freezing temperatures through a system, the method comprising the steps of:
   allowing water to flow normally through a water supply line during normal receipt of power from an electric grid;
   determining whether a power outage has occurred;
   opening a solenoid valve in response to when the power outage has occurred, wherein the solenoid valve is positioned between an inlet and a first conduit;
   engaging water within a generator which is in communication with the first conduit to generate electricity;
   directing water into a second conduit from the generator; and
   returning water to the water supply line through an outlet in communication with the second conduit;
   wherein the water supply line is configured to flow water therethrough from the inlet to the outlet when the valve is closed.

8. The method of claim 7, further comprising the steps of:
   regulating electricity with a voltage regulator to create a uniform voltage of power created by the generator;
   transforming power created by the generator into usable AC or DC current; and
   storing power in a battery for later use.

9. The method of claim 8, further comprising the steps of:
   retrieving electricity from the battery through a logic network when required by the furnace.

10. The method of claim 7, wherein the generator is operable with an impeller to generate electricity.

11. The method of claim 7, wherein the battery is a rechargeable lithium ion battery.

12. A system configured to determine if a power outage occurs, the system comprising:
   an inlet which draws water from a water supply line;
   a solenoid valve positioned proximate the inlet configured to open in response to when the system determines that a power outage has occurred;
   a generator having an impeller which receives water from the inlet when the solenoid valve is open and generates electricity;
   an outlet to return water used by the generator to the water supply line;
   a battery which stores power created by the generator for later supply to a furnace;
   wherein the water supply line is configured to flow water therethrough from the inlet to the outlet when the solenoid valve is closed.

13. The system of claim 12, further comprising:
   a voltage regulator which receives electricity from a DC generator and provides a uniform voltage; and
   a rectifier which receives power from the voltage regulator and creates current prior to entry into the battery.

14. The system of claim 12, wherein the battery is a rechargeable lithium ion battery.

15. The system of claim 12, further comprising:
   a logic controller configured to determine when to draw electricity from the battery to power the furnace.

* * * * *